US009648194B2

(12) United States Patent
Kimura et al.

(10) Patent No.: US 9,648,194 B2
(45) Date of Patent: May 9, 2017

(54) DOCUMENT READING DEVICE AND IMAGE FORMING APPARATUS INCLUDING SAME

(71) Applicants: Norio Kimura, Kanagawa (JP); Takashi Fujii, Kanagawa (JP); Hiroshi Kubo, Kanagawa (JP); Shinya Kitaoka, Kanagawa (JP)

(72) Inventors: Norio Kimura, Kanagawa (JP); Takashi Fujii, Kanagawa (JP); Hiroshi Kubo, Kanagawa (JP); Shinya Kitaoka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/637,890

(22) Filed: Mar. 4, 2015

(65) Prior Publication Data

US 2015/0256701 A1 Sep. 10, 2015

(30) Foreign Application Priority Data

Mar. 10, 2014 (JP) .................................. 2014-046385

(51) Int. Cl.
*H04N 1/04* (2006.01)
*H04N 1/203* (2006.01)

(52) U.S. Cl.
CPC ................................ *H04N 1/2034* (2013.01)

(58) Field of Classification Search
CPC ............ H04N 1/00915; H04N 1/00572; H04N 1/00896
USPC ........ 358/474, 496, 497, 498, 401, 501, 486, 358/468, 408
See application file for complete search history.

(56) References Cited

U.S. PATENT DOCUMENTS

| 5,974,284 A * | 10/1999 | Sato | G03G 15/50 |
| | | | 358/401 |
| 7,224,492 B2 * | 5/2007 | Orikasa | H04N 1/00002 |
| | | | 358/400 |
| 2007/0109610 A1 | 5/2007 | Sasaki | |
| 2012/0113482 A1 * | 5/2012 | Sakai | H04N 1/121 |
| | | | 358/474 |
| 2013/0070311 A1 * | 3/2013 | Gyobu | H04N 1/2034 |
| | | | 358/474 |

(Continued)

FOREIGN PATENT DOCUMENTS

| JP | 2004-246298 | 9/2004 |
| JP | 2007-142759 | 6/2007 |
| JP | 2011-071779 | 4/2011 |

*Primary Examiner* — Cheukfan Lee
(74) *Attorney, Agent, or Firm* — Harness, Dickey & Pierce, P.L.C.

(57) ABSTRACT

A document reading device including an image reader. The image reader includes a first reader to read a first image from a first face of a document fed by a document feeder and a second reader to read a second face of the document. An operation mode is switchable between a normal operation mode in which the image reader is in an operation enabled state and an energy-saving mode in which the image reader is in an operation stop state. In a return from the energy saving mode to the normal operation mode, the image reader performs a start-up operation including a first initial operation for returning the first reader to the normal operation mode and then performs a second initial operation for returning the second reader to the normal operation mode.

20 Claims, 14 Drawing Sheets

(56) References Cited

U.S. PATENT DOCUMENTS

2016/0198059 A1\* 7/2016 Kubo ................. H04N 1/00896
358/1.13

\* cited by examiner

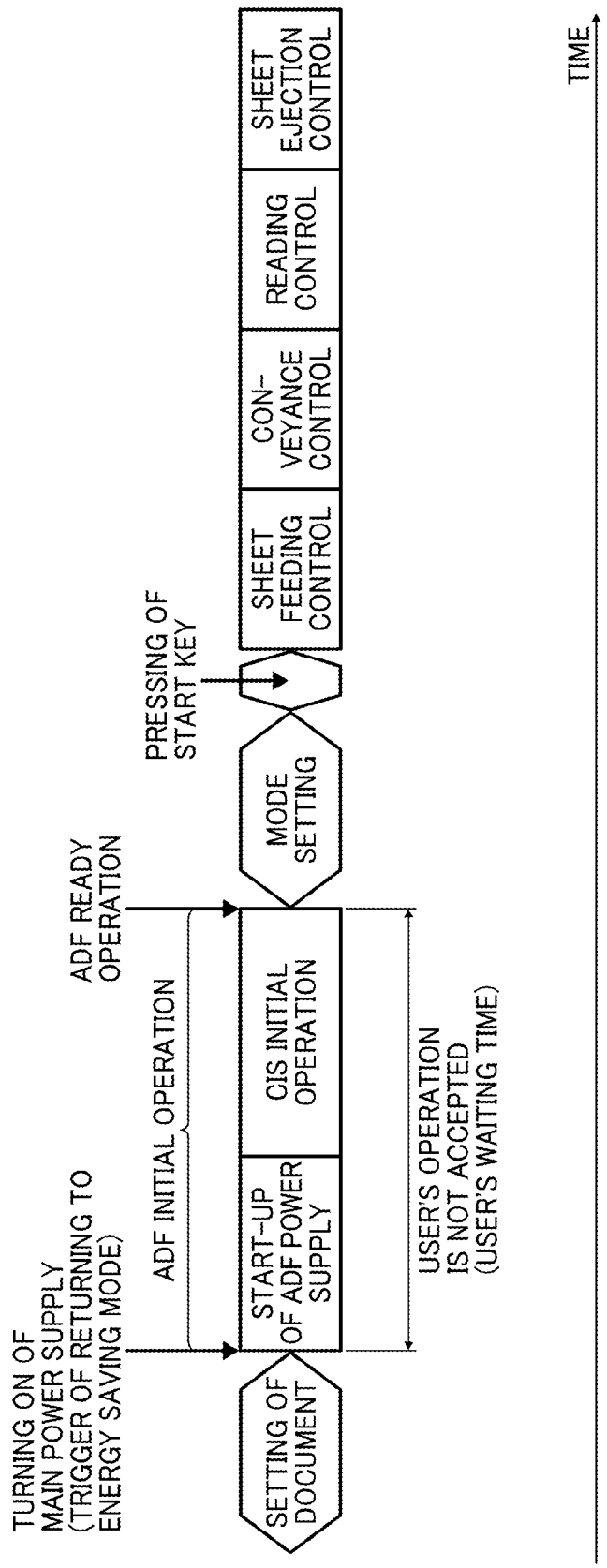

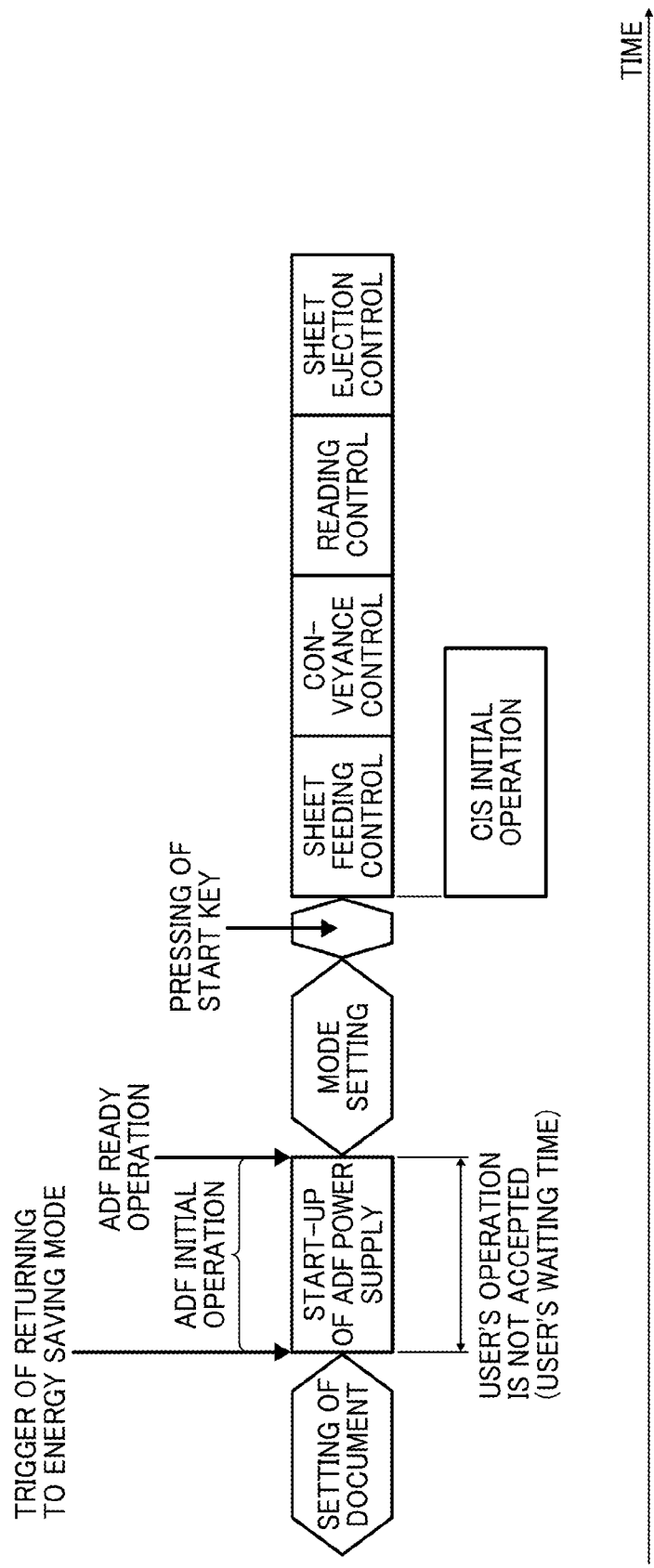

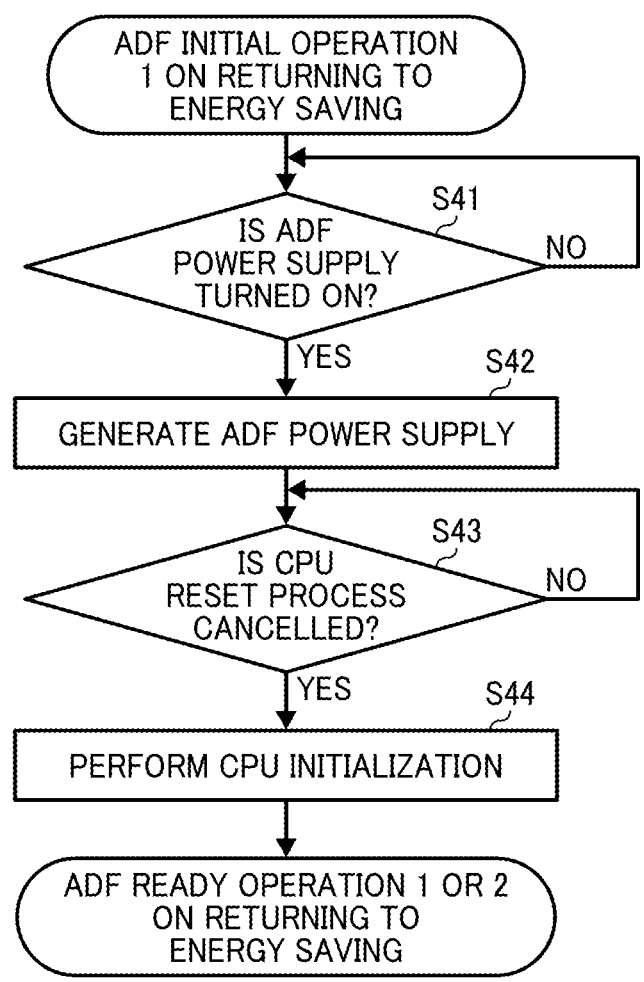

DOCUMENT READING DEVICE AND IMAGE FORMING APPARATUS INCLUDING SAME

CROSS-REFERENCE TO RELATED APPLICATIONS

This patent application is based on and claims priority pursuant to 35 U.S.C. §119(a) to Japanese Patent Application No. 2014-046385, filed on Mar. 10, 2014, in the Japan Patent Office, the entire disclosure of which is hereby incorporated by reference herein.

BACKGROUND

Technical Field

Embodiments of this disclosure relate to a document reading device and an image forming apparatus including the same and more particularly, to an auto document feeder (hereinafter, simply referred to as an ADF) of a sheet-through system that is mounted on an image forming apparatus and is configured to enable dual-face reading of a document.

Description of the Related Art

For office equipment such as a multifunction peripheral (hereinafter, simply referred to as an MFP) on which an ADF is mounted, a user often leaves the office equipment in a state in which main power is supplied to the office equipment, such that the user can use the office equipment immediately when the user desires to use the office equipment. To reduce consumption power in a standby mode, the office equipment may have a function of automatically switching a mode into a low consumption power mode, that is, a so-called energy saving mode when a non-used state continues for a constant time or more.

In the energy saving mode, power for sensing is supplied to only an operation panel or a document set sensor of the ADF serving as a trigger when the user uses the office equipment, and other power supplies are turned off. In this way, in the office equipment according to the related art, the power supplies other than the power supply for the sensing are turned off in the energy saving mode, so that low power consumption is realized.

The office equipment in the energy saving mode returns to a normal operation mode in which a normal operation is enabled, through a course of, for example, "setting of a document on the ADF or detection of an operation of the operation panel", "an initial operation of the office equipment including the ADF", and "restart of the office equipment". Accordingly, when the office equipment returns from the energy saving mode, a user waits for a time (hereinafter, also referred to as "energy-saving returning time") until the initial operation of the ADF is completed.

SUMMARY

In at least one aspect of this disclosure, there is provided an improved document reading device including an image reader. The image reader includes a first reader to read a first image from a first face of a document fed by a document feeder and a second reader to read a second face of the document. An operation mode is switchable between a normal operation mode in which the image reader is in an operation enabled state and an energy-saving mode in which the image reader is in an operation stop state. In a return from the energy saving mode to the normal operation mode, the image reader performs a start-up operation including a first initial operation for returning the first reader to the normal operation mode and then performs a second initial operation for returning the second reader to the normal operation mode.

In at least one aspect of this disclosure, there is provided an improved image forming apparatus including a document feeder and a document reading device. The document feeder feeds a document. The document reading device includes an image reader. The image reader includes a first reader to read a first image from a first face of the document fed by the document feeder and a second reader to read a second face of the document. An operation mode is switchable between a normal operation mode in which the image reader is in an operation enabled state and an energy-saving mode in which the image reader is in an operation stop state. In a return from the energy saving mode to the normal operation mode, the image reader performs a start-up operation including a first initial operation for returning the first reader to the normal operation mode and then performs a second initial operation for returning the second reader to the normal operation mode.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIGS. 9A to 9C are diagrams illustrating comparison of ADF initial operation times at the time of supplying main power and at the time of energy-saving returning in a copy machine including an auto document feeder according to an embodiment of the present invention;

FIG. 10 is a flowchart illustrating a process flow in an ADF initial operation 1 at the time of energy-saving returning in a copy machine including an auto document feeder according to an embodiment of the present invention;

Figure 1:
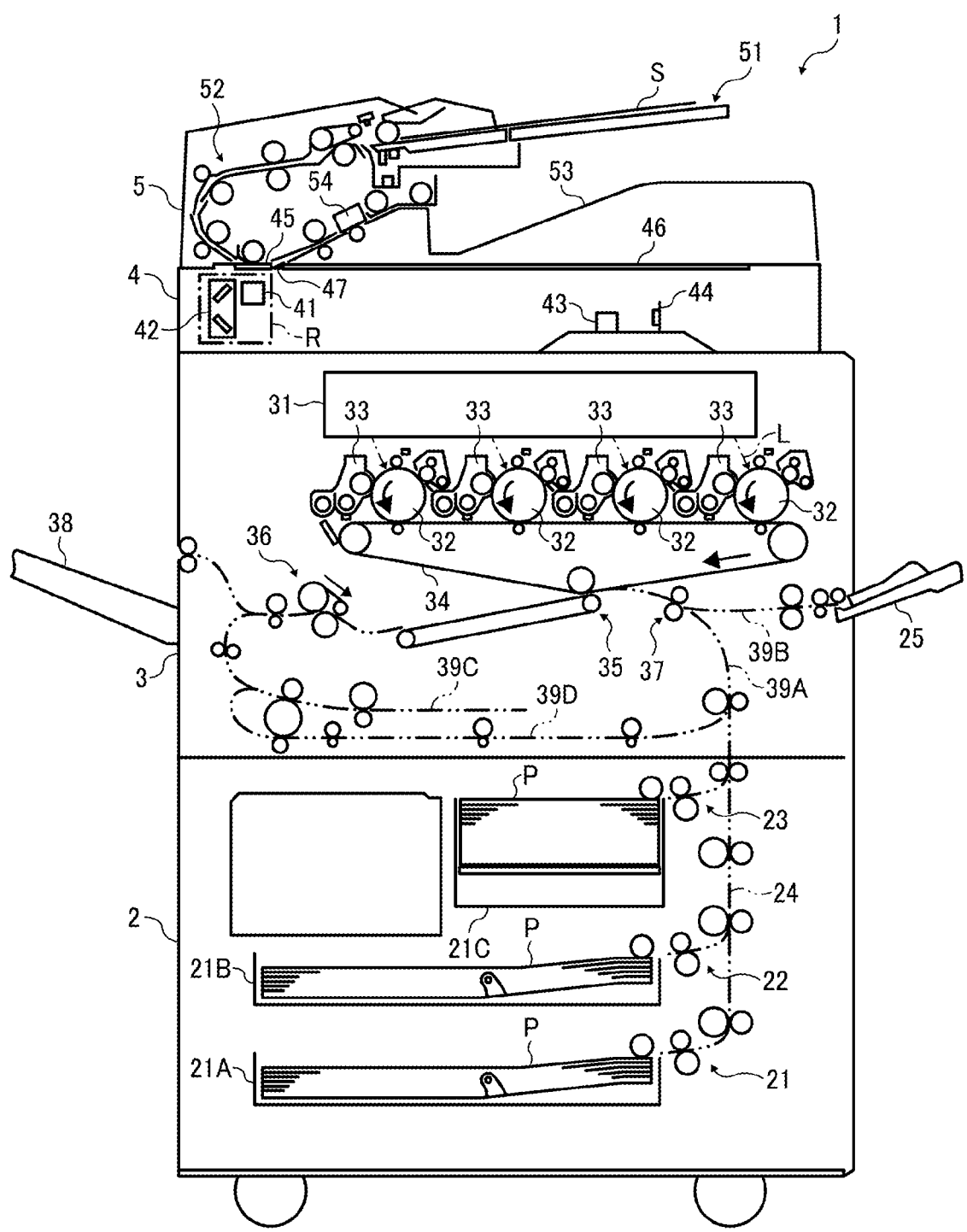
FIG. 1 is a schematic cross-sectional view of a copy machine including an auto document feeder according to an embodiment of the present invention.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, embodiments of the present invention will be described with reference to the drawings. In this embodiment, the case in which a copy machine of an electrophotographic system is applied as an image forming apparatus including an auto document feeder (ADF) is illustrated as an example. As the copy machine, a full-color copy machine forming an image using a general electrostatic image formation method and a copy machine forming a monochromatic image are exemplified. In addition to the electrophotographic system, an ink jet system can be used as an image forming system. The image forming apparatus is not limited to the copy machine and may be a facsimile machine, a printer functioning as a printing apparatus, and office equipment such as an MFP.

As illustrated in FIG. 1, a copy machine 1 includes a sheet feeding unit 2, an image forming unit 3, an image reading unit 4 serving as a first reader, and an ADF 5 serving as a document reading device. In addition, in this embodiment, an image reader (image reading unit) includes the image reading unit 4 serving as the first reader and a second reader 54 of the ADF 5.

The sheet feeding unit 2 has sheet feeding cassettes 21A, 21B, and 21C of upper and lower three steps that can store sheet-like recording sheets (recording media) P having the same sizes or different sizes. The sheet feeding unit 2 has sheet feeding devices 21, 22, and 23 that pick up the recording sheets P stored in the sheet feeding cassettes 21A, 21B, and 21C and feed the recording sheets P. The sheet feeding unit 2 has a sheet feeding passage 24 that is formed of various rollers to feed the recording sheets P fed from the sheet feeding devices 21, 22, and 23 to predetermined image formation positions of the image forming unit 3.

The image forming unit 3 includes an exposure device 31, a plurality of photoconductor drums 32, a developing device 33 into which toners of different colors (for example, cyan (C), magenta (M), yellow (Y), and black (K)) are filled, a transfer belt 34, a secondary transfer unit 35, and a fixing unit 36.

The image forming unit 3 exposures (laser light L) each photoconductor drum 32 by the exposure device 31, on the basis of a read image read by the image reader, and forms a latent image on each photoconductor drum 32. Thereby, each developing device 33 supplies a toner of a different color to each photoconductor drum 32 and develops each latent image.

In addition, the image forming unit 3 primarily transfers a toner image of each color in each photoconductor drum 32 to the transfer belt 34 and secondarily transfers a toner image of a full color to the recording sheets P by the secondary transfer unit 35. Then, the image forming unit 3 melts the toner image by the fixing unit 36 and fixes a color image on the recording sheet P.

However, the image forming unit 3 has a conveyance passage 39A that receives the recording sheet P feed to the sheet feeding passage 24 of the sheet feeding unit 2 and ejects the recording sheet P to a stack tray 38 via the secondary transfer unit 35 and the fixing unit 36 in a state synchronized with the toner image on the transfer belt 34 by a registration unit 37.

In addition, the image forming unit 3 has a bypass sheet feeding passage 39B that feeds recording sheets loaded on a bypass tray 25 to the conveyance passage 39A at the upstream side of the registration unit 37.

When an image is formed on both faces of the recording sheet P, the image forming unit 3 re-feeds the recording sheet P after image fixing of the surface side to the upstream side of the registration unit 37 via a switchback passage 39C and an inversion passage 39D.

The image reading unit 4 includes a first carriage 41 on which a light source and a mirror member are mounted, a second carriage 42 on which a minor member is mounted, an imaging forming lens 43, and an image pickup unit 44.

The image pickup unit 44 is configured using an image pickup device such as a charge-coupled device (CCD) and executes photoelectric conversion on a reflection light image from a document formed through the imaging forming lens 43 and outputs an analog image signal to be a surface reading image to the exposure device 31 of the image forming unit 3.

In addition, when a surface image to be a first image of a document S being fed by the ADF 5 is read, the image reading unit 4 moves the first carriage 41 to a portion (in FIG. 1, a position shown by a reference mark R) immediately below a slit glass 45 and stops the first carriage 41 at the first reading position R.

In addition, the first carriage 41 irradiates the document S passing through the slit glass 45 with illumination light from the light source. Reflection light that passes through the slit glass 45 and is reflected on a surface (first surface) of the document S forms an image in the image pickup unit 44 by the imaging forming lens 43 via each mirror member mounted on the first carriage 41 and the second carriage 42 and the image is read as a surface reading image. At the first reading position R, a surface image of the document S is conjugated with the image pickup unit 44 with respect to the imaging forming lens 43.

Meanwhile, in the image reading unit 4, a contact member 47 hitting the document placed on a platen glass 46 and positioning the document is provided between the slit glass 45 and the platen glass 46.

When the document placed on the platen glass 46 is read in a state in which the document hits the contact member 47, the first carriage 41 and the second carriage 42 are moved in a leftward-to-rightward direction (a sub-scanning direction) in FIG. 1.

The first carriage 41 and the second carriage 42 move in the sub-scanning direction at a speed ratio of 2:1. Even when the first carriage 41 and the second carriage 42 move according to a relation of the moving speeds, a passage length from the surface of the document to the imaging forming lens 43 does not change.

In addition, in the course of moving the respective carriages 41 and 42, the light source irradiates the document with light and reflection light from the document is returned by the respective mirror members mounted on the respective carriages 41 and 42. The reflection light forms an image by the imaging forming lens 43 and is read by the image pickup unit 44.

Here, the ADF 5 to be described below is generally attached rotatably through a hinge at the rear side of a forward-to-backward direction (main scanning direction) of FIG. 1. Thereby, the ADF 5 can be opened or closed manually by a user at an arbitrary angle around the rear side. Therefore, the document can be set manually set to the platen glass 46 and a thick document such as a magazine as well as a sheet-like document becoming a regular sheet can be set to the platen glass 46.

In the sheet feeding unit 2, the image forming unit 3, and the image reading unit 4, driving in a normal operation mode or an energy-saving returning mode is controlled by a main-body controller 111 to be described below. Various driving controls are performed by using known technologies, and therefore detailed description thereof is omitted herein.

Although described in detail below, the ADF 5 includes a document tray 51 that functions as a document platen, a document feeding unit (document feeder) 52 that is formed of various rollers, and a sheet ejection tray 53 that accumulates the document S after image reading.

That is, the ADF 5 separates the uppermost document S from a document bundle of the documents S placed on the document tray 51 one by one and feeds the document S to the slit glass 45 by the document feeder 52. In addition, the ADF 5 reads the surface image of the document S by the image reading unit 4 when the document S passes through the slit glass 45 and reads a back surface image to be a second image of the document S by the second reader 54 to be described below, according to necessity (setting of a dual-face reading mode). In addition, the ADF 5 ejects the document S after image reading to the sheet ejection tray 53.

As described above, the ADF 5 is attached rotatable such that lift-up and lift-down are enabled between an exposure position of the platen glass 46 and a covering position of the platen glass 46.

The copy machine 1 according to this embodiment has a function of automatically switching a normal operation mode into a low consumption power mode, that is, a so-called an energy saving mode (operation stop state), when a non-used state continues for a constant time or more in a state in which main power is supplied.

Next, the basis configuration, operation, and function of the ADF 5 will be described.

Figure 2:
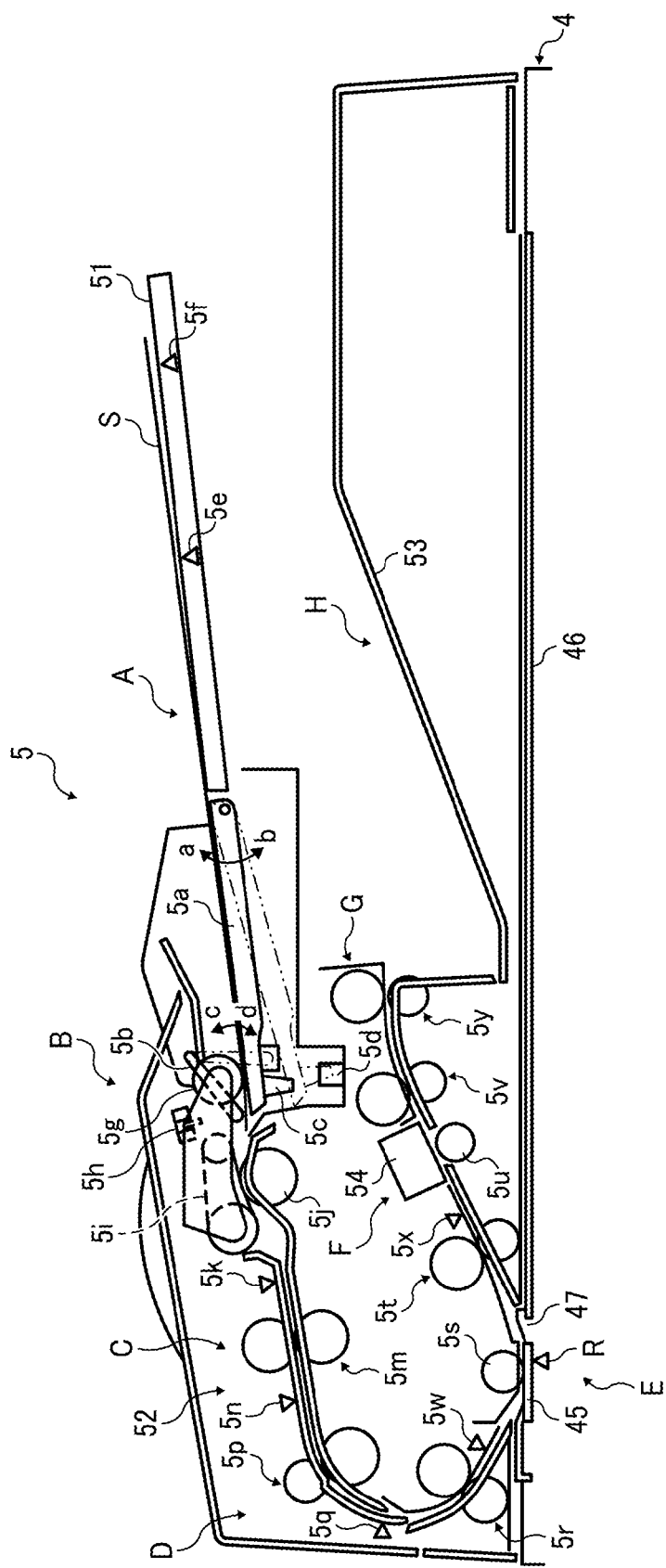
FIG. 2 is a schematic cross-sectional view of an auto document feeder according to an embodiment of the present invention.

FIG. 2 illustrates a configuration example of the ADF 5.

In the ADF 5, a document set unit A, a separation feeding unit B, a registration unit C, a turn unit D, a first reading/feeding unit E, a second reading/feeding unit F, a sheet ejection unit G, and a stack unit H are arranged along the document feeder 52 of the document S.

The document set unit A can set the documents S to be read as a document bundle of a unit of a plurality of sheets. The document set unit A has a movable document table 5a that includes the document tray 51 to set the document bundle. The document bundle is set in a state in which the surface (surface image side) of the document S is upward on the document tray 51. The movable document table 5a can move up and down in directions indicated by arrows a and b, according to the number of documents of the document bundle set on the document tray 51.

A movable side guide is provided in the document set unit A and a width (main scanning) direction perpendicular to a conveyance direction of the document S set to the movable document table 5a is positioned by the side guide. In addition, a set filler 5b, a document set sensor 5c, and a bottom-plate home-position sensor 5d to detect a set of documents S are provided in the document set unit A.

In the document set unit A, document length detection sensors 5e and 5f to measure a schematic length of a conveyance direction of documents S set to a top surface of the document tray 51 are provided. As the document length detection sensors 5e and 5f, a reflection-type sensor and an actuator-type sensor that can detect the document S even when the number of documents S is one are used. The document length detection sensors 5e and 5f are arranged at positions where at least a set direction (showing whether feeding is longitudinal feeding where a longitudinal direction of the documents S is matched with the conveyance direction or horizontal feeding where a short direction of the documents S is matched with the conveyance direction) of the documents S having the same sizes can be determined.

The separation feeding unit B separates the document S from the document bundle set to the document set unit A one by one and feeds the document S to the registration unit C. The separation feeding unit B has a pickup roller 5g, a table rising sensor 5h, a sheet feeding belt 5i, and a reverse roller 5j.

The pickup roller 5g is operated in directions indicated by arrows c and d, by a cam mechanism driven by a pickup elevation motor 101 to be described below. In addition, the pickup roller 5g rotates in a sheet feeding (conveyance) direction by forward rotation of a pickup conveyance motor 115 to be described below. In this way, the uppermost document S of the document bundle on the movable document table 5a that contacts the pickup roller 5g is taken to the conveyance direction side, according to the start of a document reading operation.

The table rising sensor 5h detects that the pickup roller 5g is pushed to a position of the upper limit by the uppermost document S of the document bundle on the movable document table 5a, according to rising of the movable document table 5a.

The sheet feeding belt 5i is driven in a sheet feeding (conveyance) direction by forward rotation of a sheet feeding motor 102 to be described below. The reverse roller 5j is driven in a direction (clockwise direction) reverse to the sheet feeding direction by the forward direction of the sheet feeding motor 102. By this configuration, the uppermost document S and the document S below the uppermost document S can be separated and only the uppermost document S can be fed.

When the reverse roller 5*j* contacts the sheet feeding belt 5*i* directly by a predetermined pressure or the reverse roller 5*j* contacts the sheet feeding belt 5*i* with only one document S therebetween, the reverse roller 5*j* rotates in a counterclockwise direction according to rotation of the sheet feeding belt 5*i*. Force when the reverse roller 5*j* rotates according to the rotation of the sheet feeding belt 5*i* is set to be weaker than torque of a torque limiter, so that multi-feeding is prevented, even if two or more documents S are inserted into between the sheet feeding belt 5*i* and the reverse roller 5*j*. That is, the reverse roller 5*j* performs a function of rotating in a clockwise direction to be an original driving direction and pressing back the unnecessary document S in a reverse conveyance direction, at the time of the multi-feeding.

The registration unit C primarily contacts and aligns the document S fed by the separation feeding unit B, extracts the document S after the aligning, and feeds the document S to the turn unit D. The registration unit C has a contact sensor 5*k*, a pullout roller 5*m*, and a document width sensor 5*n*.

The contact sensor 5*k* detects a leading edge of the document S fed by the sheet feeding belt 5*i* of the separation feeding unit B. The document S of which the leading edge is detected is fed by a predetermined distance from the detection of the leading edge by the contact sensor 5*k*, until the document S contacts the pullout roller 5*m* in a stop state. As a result, driving of the sheet feeding belt 5*i* is stopped by stopping the sheet feeding motor 102 to be described below, in a state in which the document S is pressed to the pullout roller 5*m* with predetermined deflection. At this time, the pickup elevation motor 101 to be described below is rotated and the pickup roller 5*g* is evacuated from the top surface of the document S. That is, in the registration unit C, the document S is fed by only conveyance force of the sheet feeding belt 5*i*, so that the leading edge of the document S enters a nip of an upper/lower roller pair of the pullout roller 5*m*, and aligning (skew correction) of the leading edge is performed.

The pullout roller 5*m* has a function of performing the skew correction and a function of feeding the skew-corrected document S to an intermediate roller 5*p*. The pullout roller 5*m* is driven by backward rotation of the sheet feeding motor 102 to be described below. The pullout roller 5*m* and the intermediate roller 5*p* are driven when the sheet feeding motor 102 rotates backward. However, the pickup roller 5*g* and the sheet feeding belt 5*i* are not driven.

The plurality of document width sensors 5*n* are arranged in a width direction perpendicular to the conveyance direction of the document S and detect a size of the width direction of the document S fed by the pullout roller 5*m*. A length (size of a longitudinal direction) of the conveyance direction of the document S is measured from the number of pulses supplied to the sheet feeding motor 102 between detection of the leading edge and detection of a rear edge, by reading the leading edge and the rear edge of the document S by the contact sensor 5*k*.

The turn unit D turns the document S fed by the registration unit C and feeds the document S such that the surface (surface image side) of the document S is in a reading (downward) direction. The turn unit D has the intermediate roller 5*p* and a reading entry sensor 5*q*.

The intermediate roller 5*p* is driven by an intermediate conveyance motor 113 to be described below and feeds the document S fed by the pullout roller 5*m* of the registration unit C to the first reading/feeding unit E.

The reading entry sensor 5*q* detects the leading edge of the document S fed by the intermediate roller 5*p*.

Here, when the document S is fed from the registration unit C to the turn unit D according to the start of the document conveyance operation, the conveyance speed in the registration unit C is set to be higher than the conveyance speed in the first reading/feeding unit E and time until the document S is fed to the first reading/feeding unit E can be shortened.

Meanwhile, if the leading edge of the document S is detected by the reading entry sensor 5*q*, the intermediate conveyance motor 113 is controlled and deceleration of the conveyance speed starts, such that the conveyance speed of the document S is equalized to the conveyance speed at the time of reading before the leading edge of the document S enters a nip of an upper/lower roller pair of a reading entry roller 5*r*. At the same time, forward rotation of a reading motor 103 and a reading entry motor 114 to be described below is driven and the reading entry roller 5*r*, a first reading roller 5*s*, and a reading exit roller 5*t* of the first reading/feeding unit E and a second reading roller 5*u* and a CIS exit roller 5*v* of the second reading/feeding unit F are driven. In addition, if the leading edge of the document S is detected by a registration sensor 5*w*, the reading entry motor 114 to be described below is controlled, a predetermined conveyance distance is applied to decrease the conveyance speed of the document S, and the document S is stopped temporarily (registration-stopped) in front of a first reading position R.

Then, the reading entry motor 114 is controlled according to the start of the document reading operation. Thereby, the speed of the registration-stopped document S increases and the document S is fed, such that the document S rises at a predetermined conveyance speed (conveyance speed at the time of reading) until the leading edge arrives at the position facing the first reading position R.

The first reading/feeding unit E reads the surface image of the document S from the lower side of the slit glass 45. The first reading/feeding unit E has the reading entry roller 5*r*, the registration sensor 5*w*, the first reading roller 5*s*, the first reading position R, and the reading exit roller 5*t*.

The reading entry roller 5*r* is driven by the reading entry motor 114 and feeds the document S fed by the intermediate roller 5*p* of the turn unit D to the first reading position R.

The registration sensor 5*w* detects the leading edge of the document S fed by the reading entry roller 5*r*.

The first reading roller 5*s* is provided on a portion of the top surface side of the slit glass 45 facing the first reading position R. The first reading roller 5*s* is driven by the reading motor 103 to be described below and feeds the document S along the top surface of the slit glass 45. For example, the first reading roller 5*s* functions as a white reference portion to generate white reference data for shading correction.

As described above, the first reading position R corresponds to a bottom surface of the slit glass 45 of the image reading unit 4 and at the position R, the image reading unit 4 can optically read the surface image of the document S fed in a state in which the surface is downward by the turn unit D.

In this embodiment, the case in which the first reader is configured by the image reading unit 4 has been described. However, the present invention is not limited thereto and the first reader may be included inside as the ADF 5.

The second reading/feeding unit F reads a back surface image from a back surface (second surface) of the dual-face document S from which the surface image is read by the first reading/feeding unit E. The second reading/feeding unit F has a sheet ejection sensor 5*x*, the second reader 54, the second reading roller 5*u*, and the CIS exit roller 5*v*.

The sheet ejection sensor 5x detects the leading edge of the document S fed to the document feeder 52 by the reading exit roller 5t.

Figure 4:
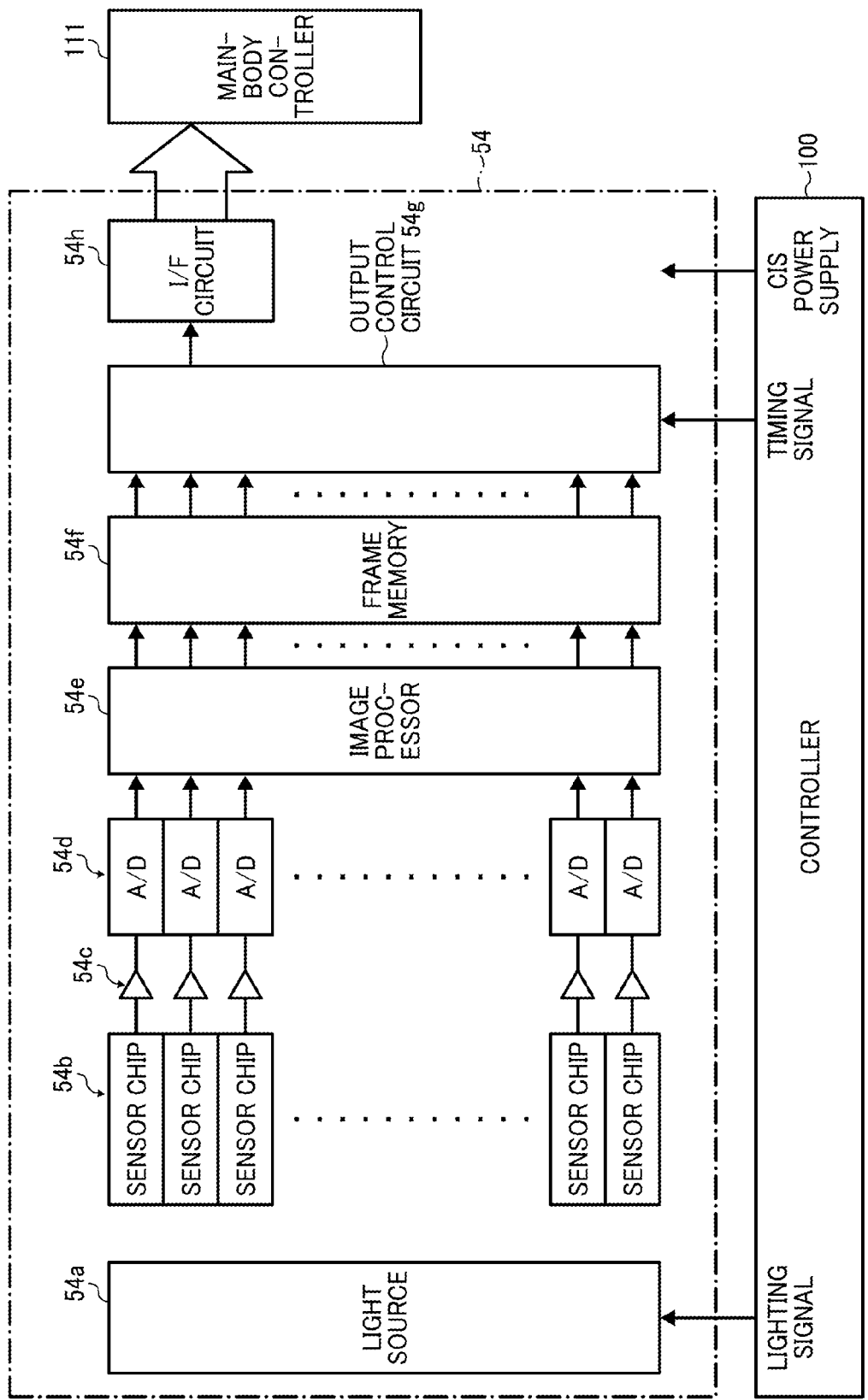
FIG. 4 is a block diagram illustrating a configuration example of a second reader in an auto document feeder according to an embodiment of the present invention.

The second reader 54 is provided on the upper side of the document feeder 52 and optically reads the back surface image (back surface reading image) of the dual-face document S, when the document S fed to the document feeder 52 is the dual-face document S. As the second reader 54, a contact image sensor (hereinafter, simply referred to as a CIS) obtained by arranging a light source 54a and a sensor chip 54b having a line shape in parallel along the main scanning direction perpendicular to the conveyance direction of the document S is used, as illustrated in FIG. 4 to be described below. The CIS has an equal magnification imaging system. The second reader 54 configured by the CIS will be described below.

The second reading roller 5u is provided on a portion of the downstream side of the document feeder 52 facing the reading position of the second reader 54. The second reading roller 5u has a function of suppressing the document S fed to the document feeder 52 from floating at the reading position of the second reader 54. In addition, the second reading roller 5u functions as a white reference portion (white reference member) to generate white reference data (shading data) for shading correction and is driven by the reading motor 103 to be described below.

Because the CIS exit roller 5v feeds the document S fed by the second reading roller 5u to the sheet ejection unit G, the CIS exit roller 5v is driven by the reading entry motor 114 to be described below.

In the case of a single-face document S in which the back surface image is not read, that is, in a single-face reading mode, the document S passes through the second reading/feeding unit F.

The sheet ejection unit G ejects the single-face document S in which reading of the surface image is completed or the dual-face document S in which reading of the surface image and the back surface image is completed to the outside of the apparatus. The sheet ejection unit G has a sheet ejection roller 5y that is driven by the sheet ejection motor 104 to be described below.

Pulses applied to the sheet ejection motor 104 are counted on the basis of detection timing of the leading edge of the document S by the sheet ejection sensor 5x and the drive speed of the sheet ejection motor 104 is decreased immediately before the rear edge of the document S is separated from the nip of the upper/lower roller pair of the sheet ejection roller 5y. Thereby, the document S ejected to the sheet ejection tray 53 is controlled not to be ejected from the sheet ejection tray 53.

The stack unit H stacks the document S after reading completion ejected by the sheet ejection unit G and holds the document S. The stack unit H has a sheet ejection tray 53 to hold the ejected document S in a lamination state.

In the second reading/feeding unit F, the document feeder 52 is provided to be opened/closed with respect to the reading position (reading surface) of the second reader 54 to remove a jammed sheet (clogged sheet due to a conveyance failure) of the document S or clean the CIS and the white reference portion (second reading roller 5u).

Figure 3:
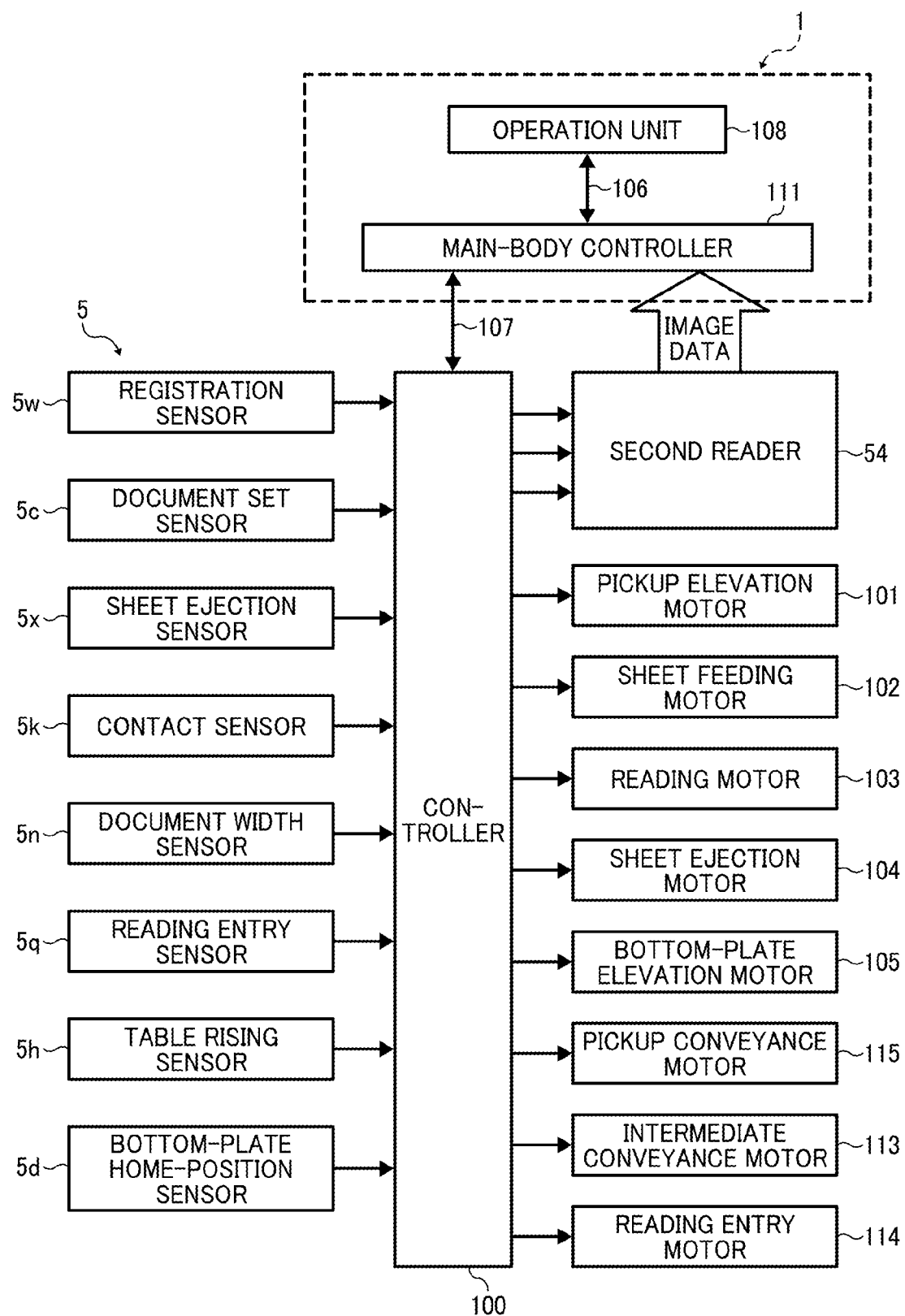
FIG. 3 is a block diagram illustrating a schematic configuration of a control circuit of an auto document feeder according to an embodiment of the present invention.

FIG. 3 illustrates a configuration example of a main portion of a control circuit of the ADF 5.

As illustrated in FIG. 3, the ADF 5 includes a controller unit (CPU) 100 functioning as an ADF controller. The registration sensor 5w, the document set sensor 5c, the sheet ejection sensor 5x, the contact sensor 5k, the document width sensor 5n, the reading entry sensor 5q, the table rising sensor 5h, and a bottom-plate home-position sensor 5d are connected to the controller 100.

In addition, the pickup elevation motor 101, the pickup conveyance motor 115, the sheet feeding motor 102, the reading motor 103, the sheet ejection motor 104, a bottom-plate elevation motor 105, the reading entry motor 114, and the intermediate conveyance motor 113 are connected to the controller 100.

The bottom-plate elevation motor 105 elevates the movable document table 5a. The pickup elevation motor 101 elevates the pickup roller 5g through an arm support. As the ADF 5, any one of the bottom-plate elevation motor 105 to elevate the movable document table 5a and the pickup elevation motor 101 to elevate the pickup roller 5g may be included.

The pickup conveyance motor 115 rotates the pickup roller 5g. The sheet feeding motor 102 rotates the sheet feeding belt 5i and the reverse roller 5j. In addition, the sheet feeding motor 102 rotates the pullout roller 5m by backward rotation. As the sheet feeding motor 102, a DC motor or a stepping motor is used. A drive motor to rotate the pullout roller 5m can be provided independently from the sheet feeding motor 102.

The reading entry motor 114 rotates the reading entry roller 5r and the CIS exit roller 5v. As the reading entry motor 114, a DC motor or a stepping motor is used. The intermediate conveyance motor 113 rotates the intermediate roller 5p. The reading entry motor 114 may function as a drive motor of the intermediate roller 5p.

The reading motor 103 rotates the first reading roller 5s and the second reading roller 5u. The sheet ejection motor 104 rotates the sheet ejection roller 5y.

The controller 100 controls the respective motors 101 to 105, 113, 114, and 115 and the second reader 54, on the basis of the signals from the respective sensors 5c, 5d, 5h, 5k, 5n, 5q, 5w, and 5x. The image reading unit 4 including the image pickup unit 44 is controlled by the main-body controller 111 to be described below.

Meanwhile, the main-body controller 111 that wholly controls the apparatus and an operation unit (operation panel) 108 that is connected to the main-body controller 111 through a bus line 106 and receives various input operations or operation instructions by the user are provided in the copy machine 1. The main-body controller 111 is connected to the controller 100 of the ADF 5 through an interface (hereinafter, also referred to as I/F) 107 and data such as a control signal is exchanged between the main-body controller 111 and the controller 100.

The operation unit 108 includes a display and a lamp to display occurrence of a jammed sheet or various error messages, in addition to various switches (buttons) and numeric keypads. As the display, a liquid crystal display of a touch panel type is adopted.

Here, a reading operation according to automatic document feeding by the ADF 5 will be described simply.

If a start key of the operation unit 108 is pressed by the user, a document feeding signal is transmitted from the main-body controller 111 to the controller 100 of the ADF 5 through the I/F 107. Thereby, the controller 100 controls the pickup elevation motor 101 and the pickup conveyance motor 115, drives rotation of the pickup roller 5g, and picks up the uppermost document S on the document tray 51 in the document set unit A.

In addition, the controller 100 controls the sheet feeding motor 102 or the intermediate conveyance motor 113, drives the sheet feeding belt 5i, the reverse roller 5j, the pullout roller 5m, and the intermediate roller 5p, and sequentially feeds the document S to the separation feeding unit B, the registration unit C, and the turn unit D.

If the leading edge of the document S is detected by the reading entry sensor 5q, the controller 100 transmits a registration stop signal to the main-body controller 111 through the I/F 107.

Next, if the controller 100 receives a reading start signal from the main-body controller 111 through the I/F 107, the controller 100 controls the reading motor 103 and the reading entry motor 114 and drives the reading entry roller 5r and the first reading roller 5s. Thereby, the speed of the registration-stopped document S is increased such that the document S rises at the predetermined conveyance speed until the leading edge of the document S arrives at the reading position and the document S is fed to the first reading/feeding unit E.

By counting the pulses of the reading motor 103, the controller 100 transmits a gate signal to the main-body controller 111 at timing when the detected leading edge of the document S arrives at the first reading position R. Because the gate signal shows an effective image area of the sub-scanning direction of the surface image of the document S, the gate signal is transmitted until the rear edge of the document S is separated from the first reading position R.

When the document S is the single-face document, that is, image reading of the single-face document is performed, the controller 100 controls the reading motor 103 and the reading entry motor 114 and drives the reading exit roller 5t, the second reading roller 5u, and the CIS exit roller 5v. Thereby, the document S passing through the first reading/feeding unit E is fed to the sheet ejection unit G via the second reader 54 of the second reading/feeding unit F.

At this time, if the leading edge of the document S is detected by the sheet ejection sensor 5x, the controller 100 controls the sheet ejection motor 104 and drives the sheet ejection roller 5y. By counting output pulses of the sheet ejection motor 104 after the leading edge of the document S is detected by the sheet ejection sensor 5x, the controller 100 decreases the drive speed of the sheet ejection roller 5y immediately before the rear edge of the document S is separated from the nip of the upper/lower roller pair of the sheet ejection roller 5y. Thereby, the document S ejected to the stack unit H is controlled not to be ejected from the sheet ejection tray 53.

Meanwhile, when the image reading of the dual-face document S is performed, the controller 100 transmits the gate signal showing the effective image area of the sub-scanning direction of the back surface image of the document S to the main-body controller 111, at timing when the leading edge of the document S arrives at the reading position by the second reader 54. In this case, the controller 100 counts the output pulses of the reading motor 103 after the leading edge of the document S is detected by the sheet ejection sensor 5x and starts transmission of the gate signal. In addition, the controller 100 ends the transmission of the gate signal, at timing when the rear edge of the document S is separated from the reading position of the second reader 54.

In this way, after the reading of the back surface image of the document S by the second reader 54 ends and the back surface image is output as the image data to the main-body controller 111, the controller 100 drives the sheet ejection motor 104 and controls the rotation of the sheet ejection roller 5y. That is, the controller 100 counts the output pulses of the sheet ejection motor 104 after the leading edge of the document S is detected by the sheet ejection sensor 5x and controls driving of the sheet ejection roller 5y such that the document S ejected to the stack unit H is not ejected from the sheet ejection tray 53.

In the ADF 5, various processes are executed as an initial (start-up) operation, at the time of start-up, that is, at the time of supplying main power and at the time of returning from the energy saving mode. As an ADF initial operation, generation of ADF power including initialization or CPU initialization and CIS initial operation are executed.

FIG. 4 illustrates a configuration example of a main portion of the second reader 54.

The second reader 54 is configured by an image reading device (image pickup device) using a reading method by the CIS. The second reader 54 includes a light source (also referred to as a CIS light source) 54a to be an illumination unit that includes an LED array, a fluorescent tube, and a cold cathode tube. In addition, the second reader 54 includes a scanning unit including a plurality of sensor (IC) chips 54b that are arranged in a line direction to be the main scanning direction and a plurality of amplifier circuits 54c that are connected to the respective sensor chips 54b.

The second reader 54 is not limited to the CIS of the equal magnification imaging system (equal magnification optical system) type and an element of a reduction optical system type using an image sensor such as a CCD can be used as the second reader 54. Even in the case of the image sensor of any type, an initial operation including initialization is necessary at the time of start-up. However, because the CIS is superior to the CCD in size reduction, the height of the ADF 5 can be suppressed low, when the CIS is installed in a limited space such as the ADF 5.

In the second reader 54, a plurality of analog/digital (A/D) converters 54d connected to the respective amplifier circuits 54c are provided.

The second reader 54 includes an image processor 54e to execute a predetermined process on an output signal (digital image signal) of each A/D converter 54d, a frame memory 54f, an output control circuit 54g, and an I/F circuit 54h.

Each of the plurality of sensor chips 54b includes a photoelectric transducer element called an equal magnification contact image sensor and a condenser lens.

Here, a lighting signal is transmitted from the controller 100 to the light source 54a before the document S enters the reading position by the second reader 54. Thereby, the light source 54a is turned on and irradiates the back surface of the document S with illumination light, so that the back surface image is optically scanned in the main scanning direction. In addition, reflection light reflected on the image surface of the document S is condensed on the photoelectric transducer element by the condenser lens in each sensor chip 54b, is subjected to photoelectric conversion for each line, and is read as an analog image signal.

After the analog image signal read by each sensor chip 54b is amplified by each corresponding amplifier circuit 54c, the analog image signal is converted into a digital image signal (image data) by each corresponding A/D converter 54d.

After the digital image signal is input to the image processor 54e and is subjected to an image process based on shading correction, the digital image signal is temporarily stored in the frame memory 54f.

In the second reader 54, the image processor 54e also executes a process for generating white reference data (shading data) becoming a white level for the shading correction, using the respective units including the light source 54a, to perform the shading correction.

In addition, in the second reader 54, in addition to a shading correction process including the executed white reference data generation process, various processes are executed as the CIS initial operation including the initialization at the time of start-up. For example, CIS communication abnormality detection, CIS initial operation, CIS black level confirmation, CIS white level confirmation, and CIS light source abnormality detection are automatically performed as the various processes in the CIS initial operation.

Here, the CIS communication abnormality detection is a process for detecting communication abnormality between the second reader 54 and an image processor ASIC. The CIS initial operation is a process for performing register setting of the second reader 54 and the image processor ASIC. The CIS black level confirmation is a process for adjusting a black level of image data to become a desired output level. The CIS white level confirmation is a process for adjusting a white level of the image data to become a desired output level. The CIS light source abnormality detection is a process for detecting whether the illumination light from the light source 54a has desired brightness.

In the copy machine 1 according to this embodiment, if the CIS initial operation is not completed when the main power is supplied, the ADF 5 does not enter a ready state (normal operation mode) in which a normal (basic) operation is enabled.

The format of the digital image signal temporarily stored in the frame memory 54f is converted into a format of data that can be received by the main-body controller 111 by the output control circuit 54g and the digital image signal is output to the main-body controller 111 through the I/F circuit 54h.

A timing signal to show timing (image data after the timing is handled as valid data) when the leading edge of the document S arrives at the reading position of the second reader 54 is output from the controller 100 to the output control circuit 54g. In addition, power for an operation (also referred to as CIS power) is supplied from the controller 100 to the second reader 54.

In the energy saving mode, supply of the CIS power to the second reader 54 is prevented. That is, in the energy saving mode, power for sensing is supplied to only the operation unit 108 or the document set sensor 5c of the ADF 5 to turn on an energy-saving cancelling trigger (to be described below) becoming the moment of returning.

An initial operation (ADF initial operation) of the ADF 5 at the time of returning from the energy saving mode will be described specifically below.

In the copy machine 1 according to this embodiment, when the mode returns from the energy saving mode, the initial operation (CIS initial operation) of the second reader 54 is executed after the ADF initial operation is completed, that is, the ADF 5 returns from the energy saving mode.

Figure 5:
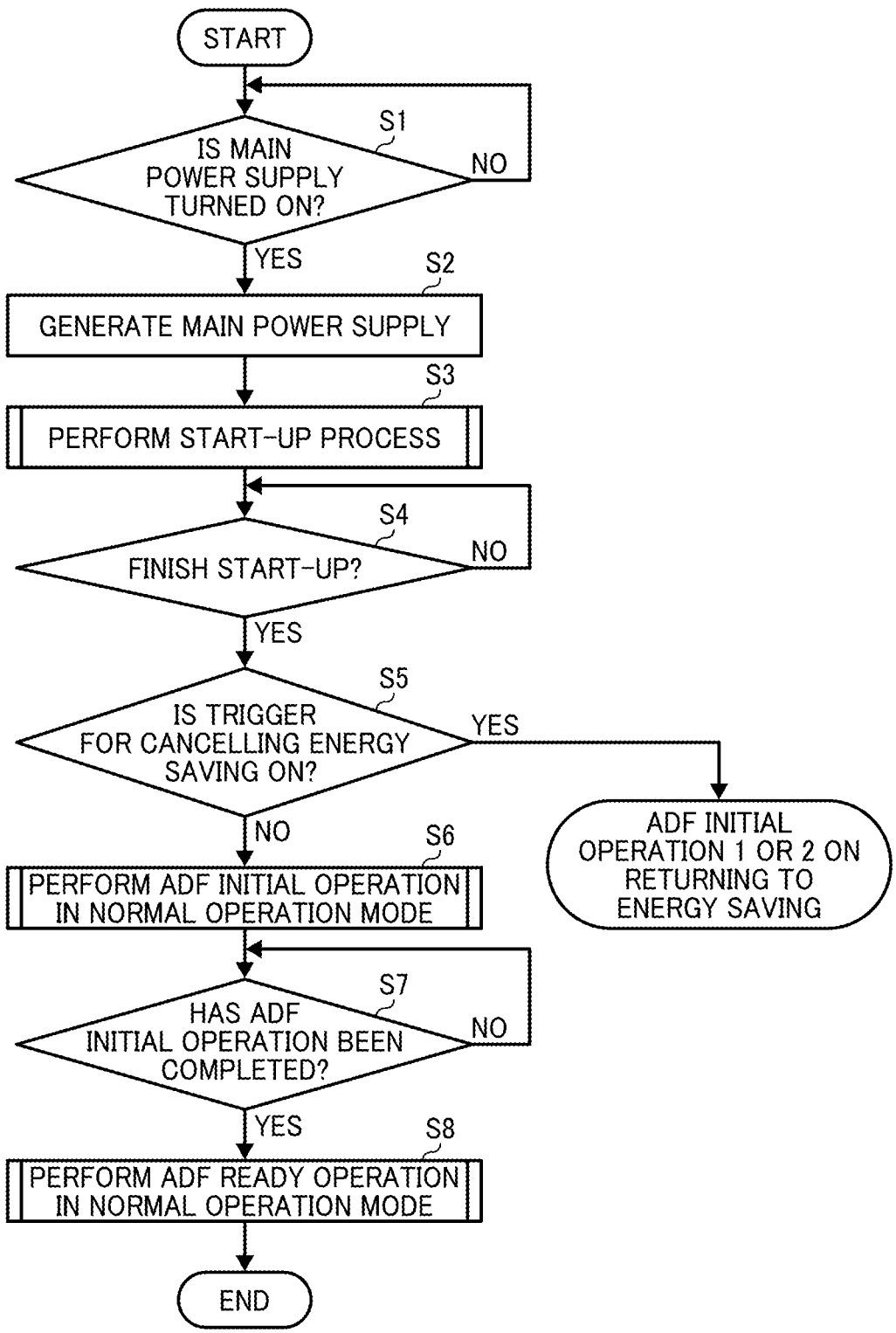
FIG. 5 is a flowchart illustrating a process flow at the time of supplying main power in a copy machine including an auto document feeder according to an embodiment of the present invention.

FIG. 5 is a flowchart illustrating a flow of a main process when main power is supplied to the copy machine 1 for comparison with the energy-saving returning.

In a power off state of the copy machine 1, for example, after the user sets the documents S to the document tray 51 of the ADF 5, a main power supply switch of the copy machine 1 is turned on.

In this case, in step S1, the main-body controller 111 determines whether the main power supply switch is turned on (ON). When it is determined that the main power supply switch is turned on (YES), in step S2, main power to set the normal operation mode in which the normal (basic) image forming operation is enabled is generated.

When it is not determined in step S1 that the main power supply switch is turned on (NO), the copy machine 1 maintains the power off state.

Meanwhile, after the main power is generated, in step S3, the start-up process at the time of the normal operation to set the normal operation mode is executed. As the start-up process, for example, each of the sheet feeding unit 2, the image forming unit 3, and the image reading unit 4 of the copy machine 1 executes the initial operation (initial operation of the first reader) including the initialization. In addition, the main-body controller 111 of the copy machine 1 executes a process for turning on an ADF power supply flag and a CIS power supply flag to be descried below, as the start-up process.

Next, in step S4, it is determined whether the start-up process to set the normal operation mode ends. When the end of the start-up process is determined (YES of step S4), in step S5, it is determined whether the energy-saving cancelling trigger to cancel the energy saving mode is turned on.

Meanwhile, when the end of the start-up process is not determined (NO of step S4), the determination process in step S4 is continuously executed until the start-up process ends.

When the main power is supplied, the energy-saving canceling trigger is turned off (NO of step S5). Therefore, in step S6, the ADF initial operation (refer to FIG. 6) at the time of the normal operation to be described below is executed.

Next, in step S7, it is determined whether the ADF initial operation at the time of the normal operation is completed. When the completion of the ADF initial operation is not determined (NO of step S7), the determination process in step S7 is continuously executed until the ADF initial operation is completed.

Meanwhile, when the completion of the ADF initial operation is determined (YES of step S7), in step S8, an ADF ready operation (refer to FIG. 8) at the time of the normal operation to be described below is executed.

After the ADF ready operation is executed, the copy machine 1 enters a state in which each of a series of processes at the time of supplying the main power described above ends and the normal image forming operation in the normal operation mode is enabled.

Figure 6:
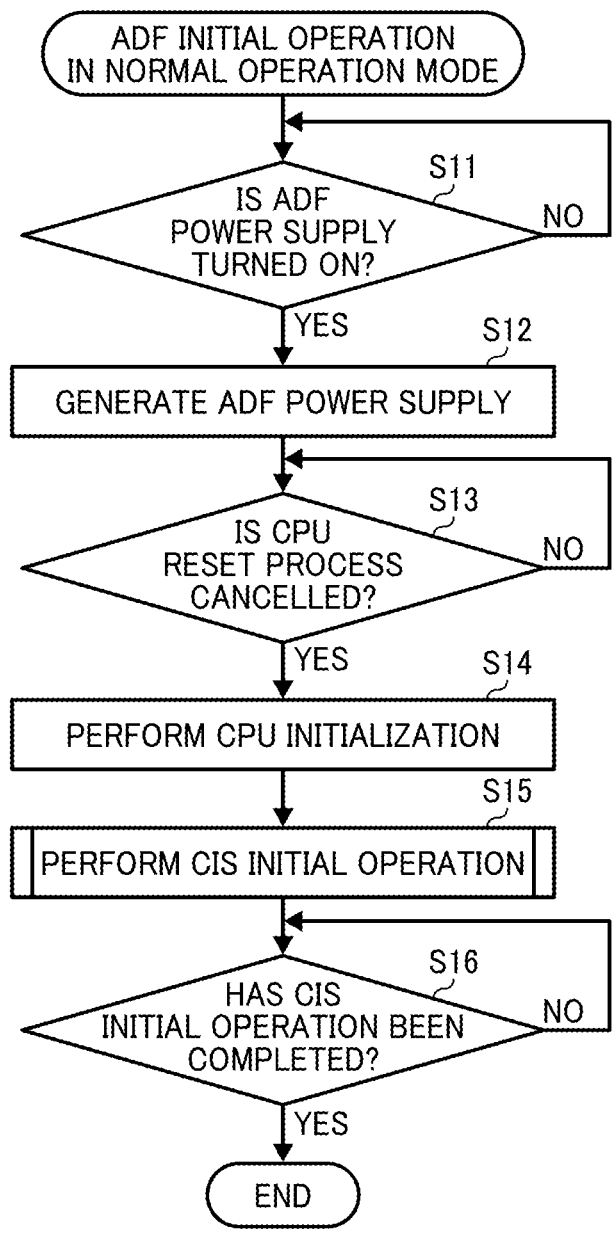
FIG. 6 is a flowchart illustrating a process flow at the time of ADF initial operation in a normal operation mode in a copy machine including an auto document feeder according to an embodiment of the present invention.

FIG. 6 is a flowchart illustrating a flow of a main process (start-up of the ADF power supply) in the ADF initial operation at the time of the normal operation, which is executed in step S6.

When the main power is supplied to the copy machine 1, in the ADF initial operation at the time of the normal operation, first, in step S11, the main-body controller 111 determines whether the ADF power supply flag is turned on. On/off of the ADF power supply flag is controlled by the main-body controller 111 of the copy machine 1, as described above.

If the ADF power supply flag is turned on, that is, the supply of the main power is determined (YES of step S11), in step S12, the ADF power to set the ADF 5 to the normal operation mode in which the normal (basic) document conveyance operation is enabled is generated.

Meanwhile, when it is not determined in step S11 that the ADF power supply flag is turned on (NO), the determination process in step S11 is continuously executed until the ADF power supply flag is turned on.

If the generation of the ADF power ends, in step S13, it is determined whether a CPU reset process to initialize the controller 100 of the ADF 5 is in a canceled state. When the canceled state of the CPU reset process is not determined (NO), the determination process in step S13 is continuously executed until the CPU reset process is canceled.

Meanwhile, if the canceled state of the CPU reset process is determined (YES of step S13), in step S14, the CPU initialization process to initialize the controller 100 is executed.

Next, in step S15, the CIS initial operation (refer to FIG. 7) to be described below is executed.

Next, in step S16, it is determined whether the CIS initial operation is completed. When the completion of the CIS initial operation is not determined (NO), the determination process in step S16 is continuously executed until the CIS initial operation is completed.

After the CIS initial operation is executed (YES of step S16), the ADF initial operation at the time of the normal operation ends and the automatic feeding operation of the document S is enabled by the ADF 5 (ADF ready operation at the time of the normal operation).

That is, when the main power is supplied, as the ADF initial operation at the time of the normal operation, the CIS initial operation executed continuously after the start-up of the ADF power supply is completed and the ADF 5 first enters an ADF ready state (refer to FIG. 9A).

Figure 7:
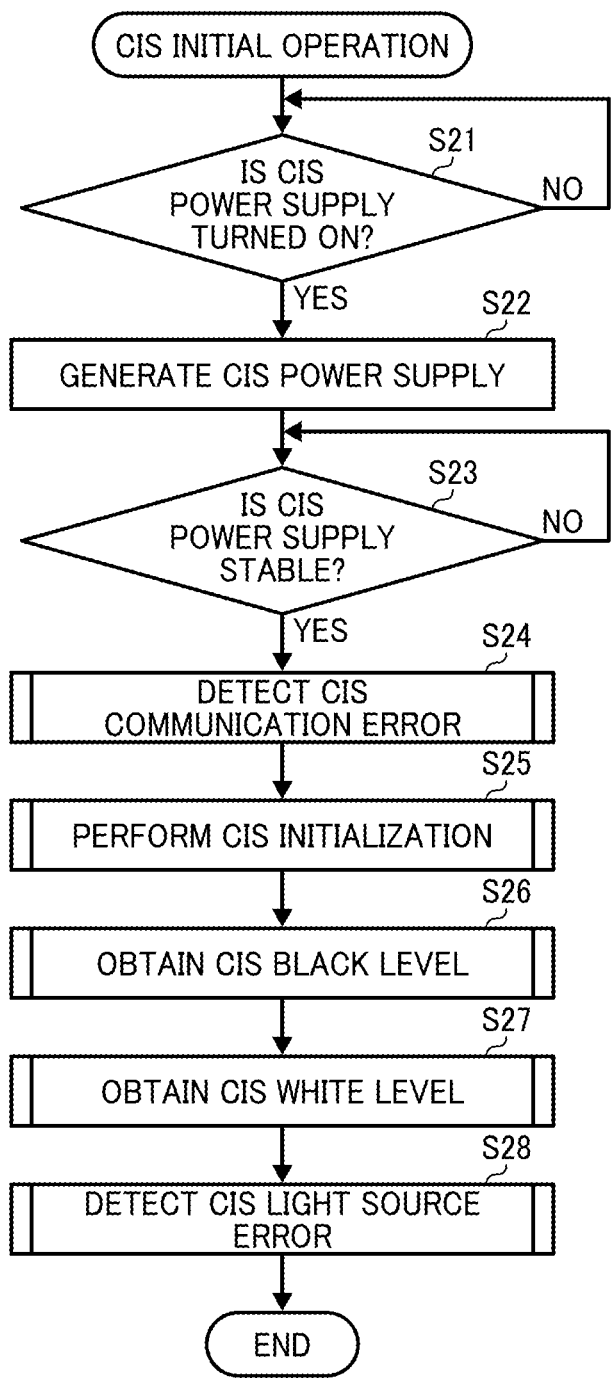
FIG. 7 is a flowchart illustrating a process flow at the time of CIS initial operation in a copy machine including an auto document feeder according to an embodiment of the present invention.

FIG. 7 is a flowchart illustrating a flow of a main process in the CIS initial operation, which is executed in step S15.

When the main power is supplied to the copy machine 1, in the CIS initial operation, first, in step S21, the main-body controller 111 determines whether the CIS power supply flag is turned on. On/off of the CIS power supply flag is controlled by the main-body controller 111 of the copy machine 1, as described above.

In step S21, when it is not determined that the CIS power supply flag is turned on (NO), the determination process in step S21 is continuously executed until the CIS power supply flag is turned on.

Meanwhile, if the CIS power supply flag is turned on, that is, the supply of the main power is determined (YES of step S21), in step S22, the CIS power to set the second reader 54 to a state in which the back surface image of the document S can be read is generated.

Next, if the generation of the CIS power ends, in step S23, it is determined whether the CIS power supply is stabilized. The determination process in step S23 is continuously executed until the CIS power supply is stabilized (NO→YES).

Meanwhile, when it is determined in step S23 that the CIS power supply is stabilized (YES), the various processes including the initialization are executed by the second reader 54. That is, in the second reader 54, in step S24, the CIS communication abnormality detection process is executed. Then, in step S25, the CIS initialization process is executed. In addition, in the second reader 54, after the CIS initialization process is executed, in step S26, the CIS black level confirmation process is executed. In addition, in the second reader 54, after the CIS black level confirmation process is executed, in step S27, the CIS white level confirmation process is executed. In addition, in the second reader 54, after the CIS white level confirmation process is executed, in step S28, the CIS light source abnormality detection process is executed.

After the CIS light source abnormality detection process is executed, the ADF 5 enters a state in which the CIS initial operation ends and setting of the dual-face reading mode to perform reading of the dual-face images including reading of the back surface image is enabled according to the automatic feeding operation at the time of the normal operation of the document S. Then, the process proceeds to step S16.

Figure 8:
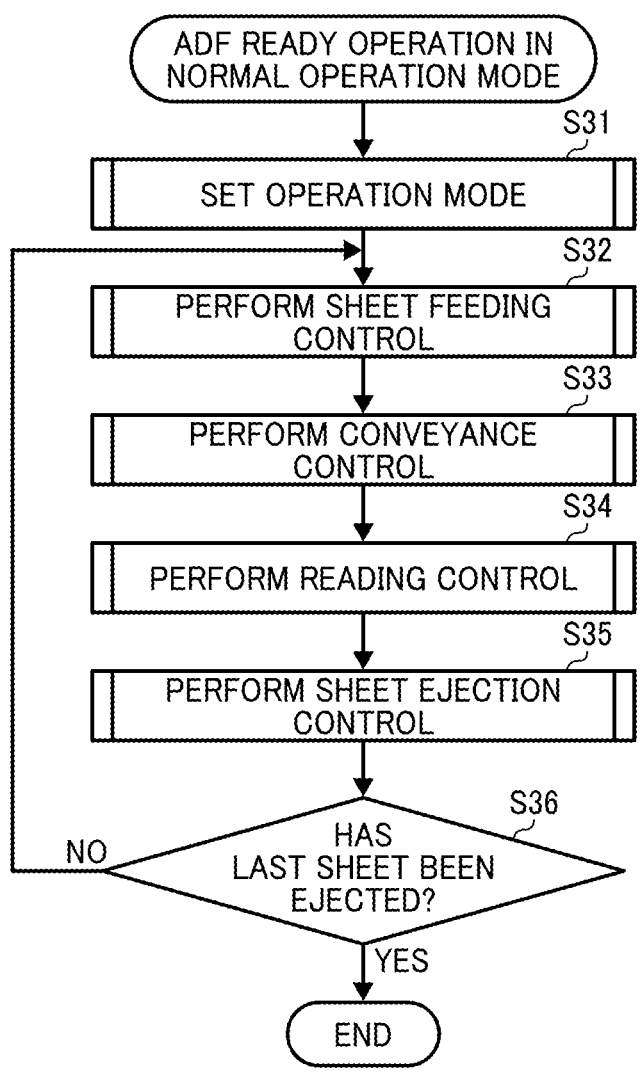
FIG. 8 is a flowchart illustrating a process flow at the time of an ADF ready operation in a normal operation mode in a copy machine including an auto document feeder according to an embodiment of the present invention.

FIG. 8 is a flowchart illustrating a flow of a main process in the ADF ready operation at the time of the normal operation, which is executed in step S8.

In the ADF ready operation at the time of the normal operation, first, in step S31, setting of the operation mode including the reading conditions such as designation of the dual-face reading mode of the document S from the operation unit 108 is performed by the user.

When the start key of the operation unit 108 is operated by the user, the ADF 5 executes the sheet feeding control (step S32), the conveyance control (step S33), the reading control (step S34), and the sheet ejection control (step S35) described above. Each control in steps S32, S33, S34, and S35 is executed according to the operation mode set by step S31.

That is, when the document S set to the document tray 51 is the single-face document, the document S is taken from the document tray 51 one by one, by the sheet feeding control in step S32. The document S taken from the document tray 51 is fed to the document feeder 52 and is fed to the first reading position R, by the conveyance control in step S33. When the document S passes through the first reading position R, the surface image is read by the image pickup unit 44 of the image reading unit 4, by the reading control in step S34. The document S from which the surface image is read is ejected to the sheet ejection tray 53 by the sheet ejection control in step S35.

Meanwhile, when the document S set to document tray 51 is the dual-face document, the document S is taken from the document tray 51 one by one, by the sheet feeding control in step S32. The document S taken from the document tray 51 is fed to the document feeder 52 and is fed to the first reading position R, by the conveyance control in step S33. When the document S passes through the first reading position R, the surface image is read by the image pickup unit 44 of the image reading unit 4, by the reading control in step S34. The document S from which the surface image is taken is fed to the second reader 54 and the back surface image is read by the second reader 54. In this way, the document S from which the surface image and the back surface image are read by one conveyance operation is ejected to the sheet ejection tray 53 by the sheet ejection control in step S35.

In the same way, a series of operations described above is repeated for all of the documents S set to the document tray 51 (NO of step S36). If ejection of the document S of the final sheet to be the lowermost sheet on the document tray 51 is completed (YES of step S36), the ADF ready operation at the time of the normal operation in step S8 ends.

Figure 9B:
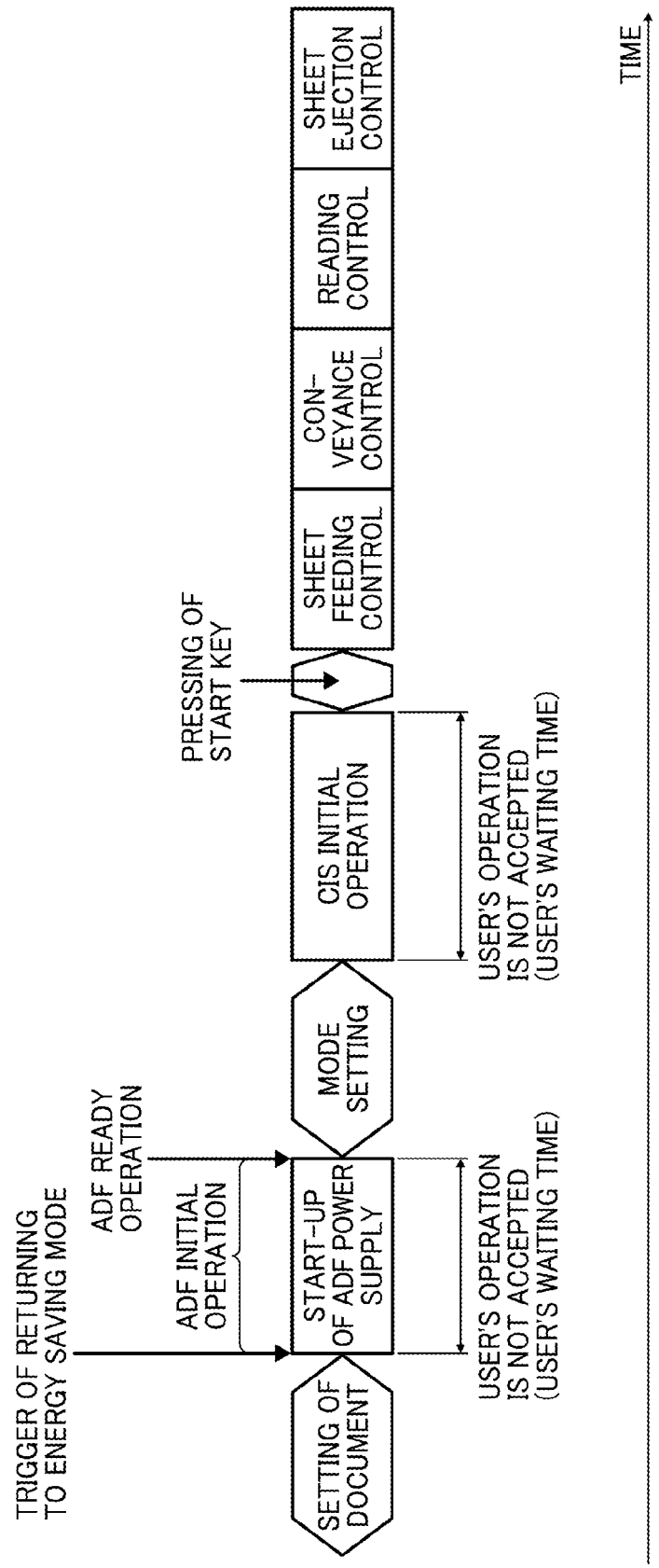

FIGS. 9A to 9C illustrate comparison of ADF initial operation times at the time of supplying main power and at the time of energy-saving mode returning.

As illustrated in FIG. 9A, in the ADF initial operation in the normal operation when the main power is supplied, the CIS initial operation (steps S15 and S21 to S28 described above) executed after the start-up of the ADF power supply (step S12) is completed and a state first proceeds to an ADF ready state. Thereby, for time until the state becomes the ADF ready state (during the ADF initial operation), because the ADF 5 is in a preparation state, the copy machine 1 cannot be operated by the user (user waiting time).

The ADF initial operation time in the normal operation when the main power is supplied is almost matched with the user waiting time at the time of returning from the energy saving mode, which is described as the related art. That is, in the related art, when the copy machine in the energy saving mode is used, the user sets the document to the document tray and the moment (energy-saving returning trigger) returning from the energy saving mode is applied, so that the ADF initial operation starts. For this reason, the ADF initial operation time until the ADF enters the ready state after the energy-saving returning trigger is applied is long and becomes the user waiting time for which the copy machine cannot be operated.

Therefore, in this embodiment, as illustrated in FIGS. 9B and 9C, the CIS initial operation at the time of returning from the energy saving mode is executed independently from the ADF initial operation and the ADF initial operation time (energy-saving returning time) is shortened.

<Energy-Saving Returning 1>

FIG. 10 is a flowchart illustrating a flow of a main process in an ADF initial operation 1 at the time of energy-saving returning, which is executed when an energy-saving cancelling trigger is turned on.

As illustrated in FIG. 10, if on of the energy-saving cancellation trigger is determined in the energy saving mode (YES in step S5 of FIG. 5), in step S41, the main-body controller 111 determines whether the ADF power supply flag is turned on, as the ADF initial operation 1 at the time of energy-saving returning.

If the ADF power supply flag is turned on, that is, returning from the energy saving mode is determined (YES of step S41), in step S42, the ADF power to return the ADF 5 to the normal operation mode is generated (start-up of the ADF power supply).

Meanwhile, in step S41, when it is not determined that the ADF power supply flag is turned on (NO), the determination process in step S41 is continuously executed until the ADF power supply flag is turned on.

If the generation of the ADF power ends, in step S43, it is determined whether the CPU reset process to initialize the controller 100 of the ADF 5 is in a cancellation state. When the cancellation state of the CPU reset process is not determined (NO), the determination process in step S43 is continuously executed until the CPU reset process is cancelled.

Meanwhile, if the cancellation state of the CPU reset process is determined (YES of step S43), in step S44, the CPU initialization process to initialize the controller 100 is executed.

Then, the process in the ADF initial operation 1 at the time of energy-saving returning ends and the process proceeds to an ADF ready operation 1 at the time of the energy-saving returning to be described below.

Figure 11:
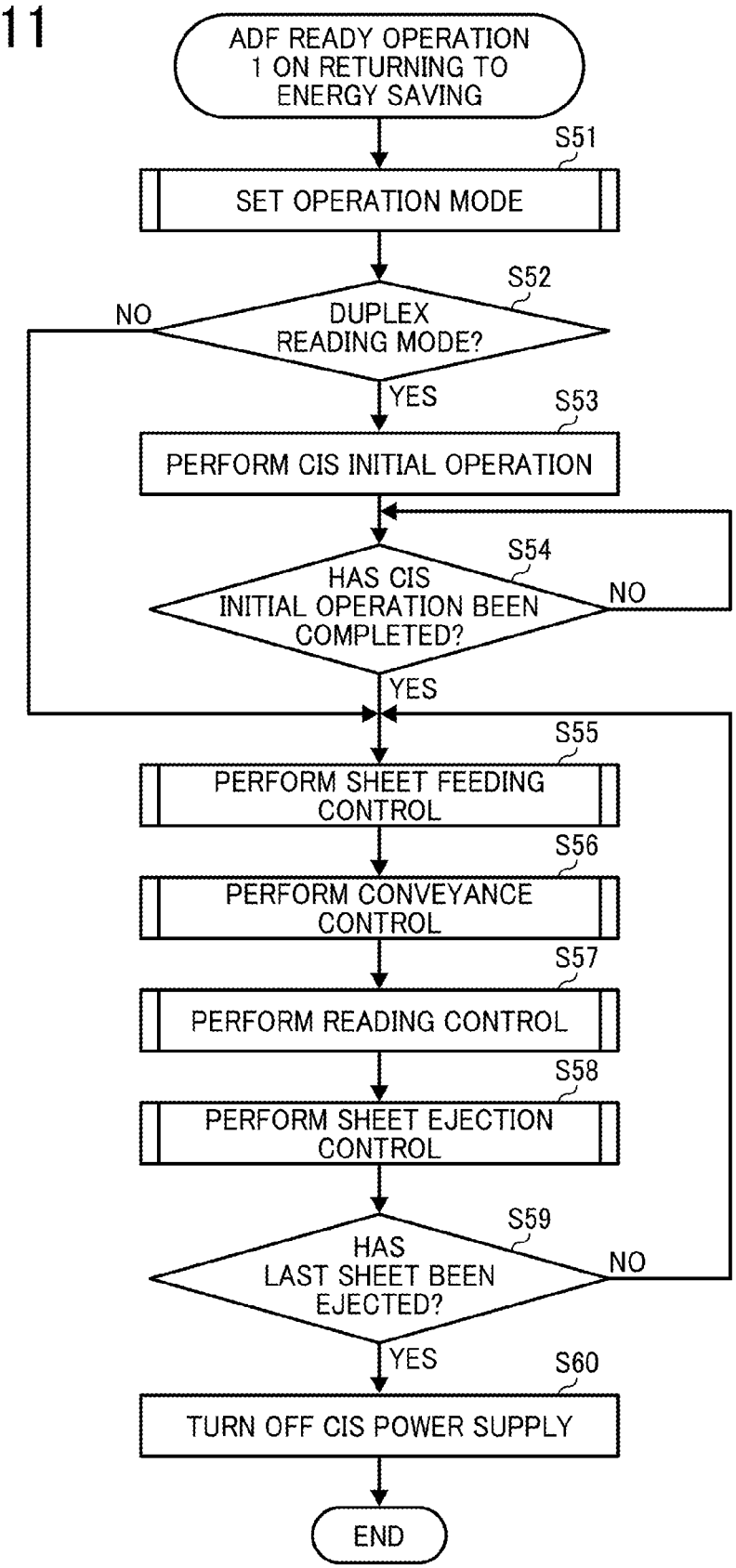
FIG. 11 is a flowchart illustrating a process flow in an ADF ready operation 1 at the time of energy-saving returning in a copy machine including an auto document feeder according to an embodiment of the present invention.

FIG. 11 is a flowchart illustrating a flow of a main process in the ADF ready operation 1 at the time of the energy-saving returning.

In the ADF ready operation 1 at the time of the energy-saving returning, first, in step S51, setting of the operation mode including the reading conditions such as designation of the dual-face reading mode of the document S from the operation unit 108 is performed by the user.

When the start key of the operation unit 108 is operated by the user, in step S52, it is determined whether the dual-face reading mode is set as the operation mode set by step S51. When the dual-face reading mode is not set (NO of step S52), the process proceeds to step S55.

Meanwhile, when the dual-face reading mode is set (YES of step S52), in step S53, the CIS initial operation (refer to FIG. 7) is executed.

Next, in step S54, it is determined whether the CIS initial operation is completed. When the completion of the CIS initial operation is not determined (NO), the determination process in step S54 is continuously executed until the CIS initial operation is completed.

In step S52, when setting of the dual-face reading mode is not determined (NO) or in step S54, when completion of the CIS initial operation is determined (YES), in step S55, the sheet feeding control of step S32 is executed. The sheet feeding control is executed according to the operation mode set by step S51.

If the sheet feeding control ends, in step S56, the conveyance control of step S33 is executed. The conveyance control is executed according to the operation mode set by step S51.

If the conveyance control ends, in step S57, the read control of step S34 is executed. The reading control is executed according to the operation mode set by step S51.

If the reading control ends, in step S58, the sheet ejection control of step S35 is executed. The sheet ejection control is executed according to the operation mode set by step S51.

In step S59, each control of steps S55 to S58 is repeated until it is determined that the final document S on the document tray 51 is ejected to the sheet ejection tray 53 (NO).

Meanwhile, if the ejection of the final document S is determined (YES of step S59), in step S60, the supply of the CIS power to the second reader 54 is turned off and the series of ADF ready operations 1 at the time of the energy-saving returning ends.

As illustrated in FIG. 9B, at the time of the energy-saving returning 1, the CIS initial operation involved in the user waiting time at the time of the normal operation is excluded from the ADF initial operation, so that energy-saving returning time until the ADF 5 enters the ADF ready state at the time of returning from the energy saving mode can be shortened. For example, when the CIS initial operation time of the ADF 5 is set to 700 msec (a result in Metis-C1), the user waiting time in the copy machine 1 can be shortened by about 700 msec.

In addition, execution timing of the CIS initial operation is set after setting of the dual-face reading mode is determined (step S53), in step S52. Thereby, the CIS initial operation to generate the CIS power can be turned off when the second reader 54 is not used, such as the single-face reading mode, reading using a pressure plate, and a print output. Therefore, consumption of standby power in the second reader 54 can be limited at the time of setting the dual-face reading mode and waste power consumption (about 7 W) can be reduced.

Even in the dual-face reading mode, the supply of the CIS power to the second reader 54 is intercepted after the final document S is ejected. Thereby, power consumption in the second reader 54 can be suppressed minimally.

In the ADF ready operation 1 at the time of energy-saving returning, because abnormality of the second reader 54 can be recognized before a sheet feeding operation of the document S, the document S can be avoided from being damaged due to an unnecessary feeding operation and the stress of the user can be reduced by early warning.

<Energy-Saving Returning 2>

Figure 12:
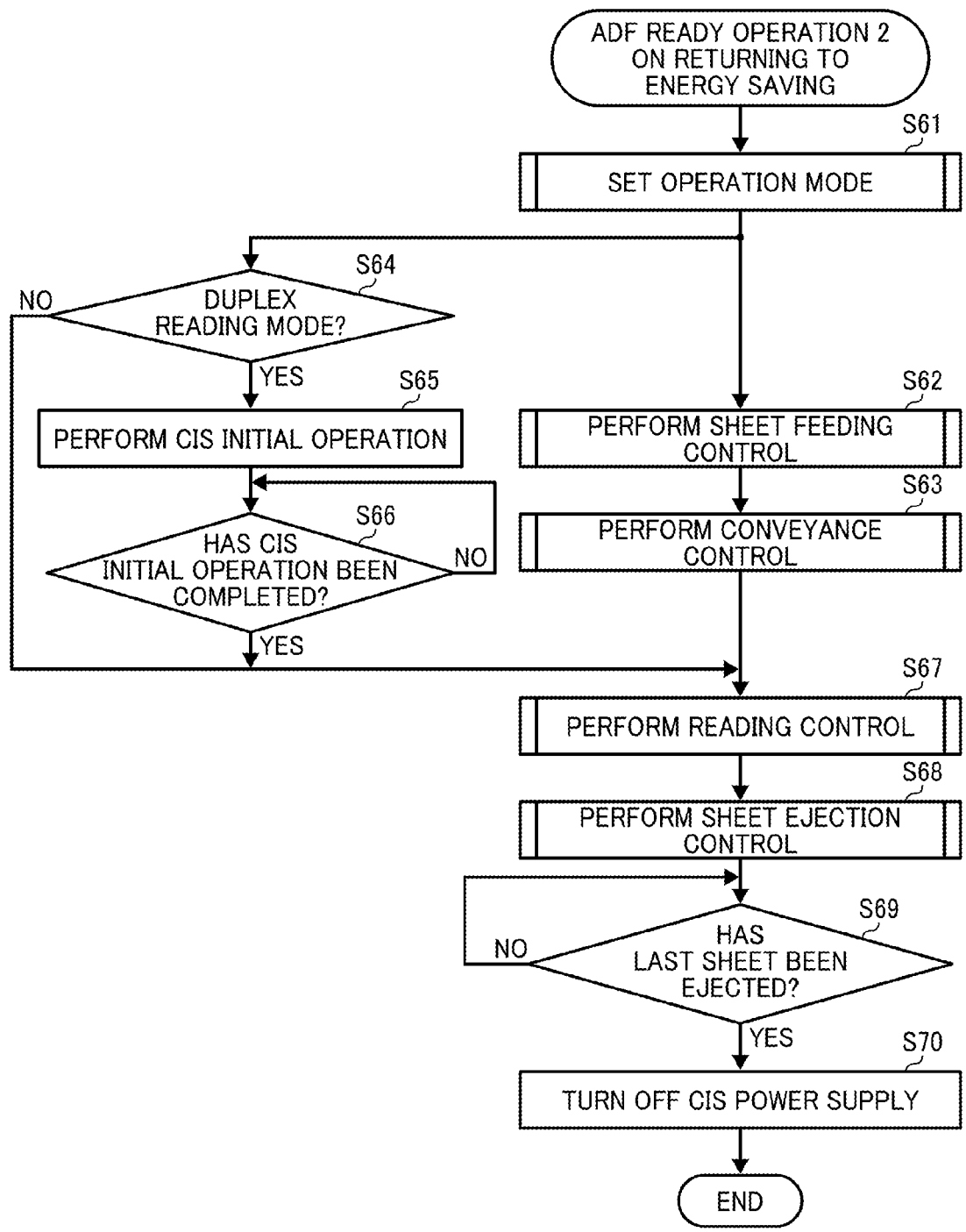
FIG. 12 is a flowchart illustrating a process flow in an ADF ready operation 2 at the time of energy-saving returning in a copy machine including an auto document feeder according to an embodiment of the present invention.

FIG. 12 is a flowchart illustrating a flow of a main process in an ADF ready operation 2 at the time of energy-saving returning.

In the ADF ready operation 2 at the time of energy-saving returning, first, in step S61, setting of the operation mode including the reading conditions such as designation of the dual-face reading mode of the document S from the operation unit 108 is performed by the user.

When the start key of the operation unit 108 is operated by the user, in step S62, the sheet feeding control of steps S32 and S55 is executed. The sheet feeding control is executed according to the operation mode set by step S61.

If the sheet feeding control ends, in step S63, the conveyance control of steps S33 and S56 is executed. The conveyance control is executed according to the operation mode set by step S61.

According to the start of the sheet feeding operation, in step S64, it is determined whether the dual-face reading mode is set, as the operation mode set by step S61. When the dual-face reading mode is not set (NO of step S64), the process proceeds to step S67.

Meanwhile, when the dual-face reading mode is set (YES of step S64), in step S65, the CIS initial operation (refer to FIG. 7) is executed.

Next, in step S66, it is determined whether the CIS initial operation is completed. When the completion of the CIS initial operation is not determined (NO), the determination process in step S66 is continuously executed until the CIS initial operation is completed.

In step S64, when the setting of the dual-face reading mode is not determined (NO) or in step S66, when the completion of the CIS initial operation is determined (YES), in step S67, the reading control of steps S34 and S57 is executed. Even when the conveyance control in step S63 ends, in step S67, the reading control of steps S34 and S57 is executed. The reading control is executed according to the operation mode set by step S61.

If the reading control ends, in step S68, the sheet ejection control of steps S35 and S58 is executed. The sheet ejection control is executed according to the operation mode set by step S61.

The determination process in step S69 is continuously executed until it is determined in step S69 that the final document S on the document tray 51 is ejected to the sheet ejection tray 53 (NO).

Meanwhile, if the ejection of the final document S is determined (YES of step S69), in step S70, the supply of the CIS power to the second reader 54 is turned off and a series of ADF ready operations 2 at the time of the energy-saving returning ends.

As illustrated in FIG. 9C, at the time of the energy-saving returning 2, the CIS initial operation involved in the user waiting time at the time of the normal operation is excluded from the ADF initial operation and the CIS initial operation is executed in parallel to the sheet feeding control (step S62) of the document S. Thereby, energy-saving returning time until the ADF 5 enters the ADF ready state at the time of returning from the energy saving mode can be shortened and the user waiting timing in the CIS initial operation until the sheet feeding control can be shortened by about 700 msec, as compared with the energy-saving returning 1 (refer to FIG. 9B).

Particularly, in the ADF ready operation 2 at the time of energy-saving returning, "time until the leading edge of the document S arrives at the second reader 54 after the sheet feeding starts>CIS initial operation time" is set, so that the user waiting time by the CIS initial operation until the sheet feeding starts can be suppressed perfectly.

When the abnormality of the second reader 54 is detected at the time of the CIS initial operation, only reading of the surface image by the image reading unit 4 may be validated as the single-face reading mode, regardless of the setting of the operation mode. In this case, the operation enabled state of the image reading unit 4 is maintained, so that deterioration of convenience of the user can be minimally suppressed, as compared with the case in which the power supply of the copy machine 1 is completely turned off.

As described above, in the ADF 5 in which reading of the back surface image of the document S is enabled, time until the initial operation of the ADF 5 is completed when the mode returns from the energy saving mode to the normal operation mode can be shortened.

That is, when the mode of the copy machine 1 returns from the energy saving mode, the CIS initial operation is excluded from the ADF initial operation of the ADF 5. Thereby, the energy-saving returning time until the ADF 5 can start up can be shortened by the CIS initial operation time. Therefore, the user waiting time when the copy machine 1 in the energy saving mode is used can be shortened.

Particularly, the CIS initial operation is executed only when the dual-face reading mode is set, so that power consumption in the second reader 54 can be greatly reduced, and an energy saving effect can be further improved.

When the dual-face reading mode is set (selected), the control can be performed such that the initial operation of the second reader 54 can be completed until the leading edge of the document S arrives at the second reader 54. In this case, because the sheet feeding of the document S can start before the CIS initial operation is completed, the user waiting time by the CIS initial operation can be completely suppressed.

In the embodiment described above, the full-color copy machine 1 is used as the image forming apparatus. However, the present invention is not limited thereto and the present invention can be applied to an apparatus of a general-purpose (monochromatic) type using only a K toner.

In addition, in this embodiment in which the image reading unit 4 of the copy machine 1 is also used as the first reader of the ADF 5, the ADF initial operation may include a start-up operation (start-up process) of the image reading unit 4.

In addition, the present invention is not limited to the copy machine and can be applied to various types of office equipment such as a printer, a facsimile, or a multifunction peripheral including these functions compositely.

As described above, at least one embodiment of the present invention has an effect of shortening returning time until an initial operation is completed at the time of returning from a low consumption mode to a normal operation mode, even when dual-face reading of a document is enabled, and is advantageous to a document reading device and an image forming apparatus including the same.

According to at least one embodiment of the present invention, it is possible to provide a document reading device and an image forming apparatus including the same that can shorten a returning time until an initial operation is completed when a mode returns from a low consumption mode to a normal operation mode, even when dual-face reading of a document is enabled.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A document reading device, comprising:
an image reader including a first reader to read a first image from a first face of a document fed by a document feeder and a second reader to read a second face of the document, an operation mode being switchable between a normal operation mode in which the image reader is in an operation enabled state and an energy-saving mode in which the image reader is in an operation stop state,
wherein, upon receipt of a trigger to return from the energy saving mode to the normal operation mode and prior to completion of a mode setting operation for the first reader, the image reader is configured to perform a start-up operation including a first initial operation to return the first reader to the normal operation mode and then perform a second initial operation to return the second reader to the normal operation mode independently of an initial operation of the document feeder and after completion of a mode setting operation for the second reader.

2. The document reading device of claim 1, wherein the image reader is configured to perform the second initial operation with a reading operation of a second image selected.

3. The document reading device of claim 1, wherein the image reader is configured to finish the second initial operation before a leading edge of the document fed by the document feeder arrives at the second reader.

4. The document reading device of claim 1, wherein the second reader is configured to be powered off at an end of a reading operation of a second image.

5. The document reading device of claim 1, wherein the first reader is configured to remain in the operation enabled state upon detection of an abnormality of the second reader.

6. The document reading device of claim 1, wherein, with the normal operation mode selected, the image reader is configured to perform the second initial operation during the start-up operation including the first initial operation.

7. The document reading device of claim 1, wherein the image reader is configured to perform the second initial operation, to return the second reader to the normal operation mode, after completion of the first initial operation.

8. The document reading device of claim 1, wherein the image reader is configured to perform the second initial operation, to return the second reader to the normal operation mode, after enablement of a dual face mode for reading of both the first and second face of the document.

9. An image forming apparatus, comprising
a document feeder to feed a document; and
a document reading device including
an image reader including a first reader to read a first image from a first face of the document fed by the document feeder and a second reader to read a second face of the document, an operation mode being switchable between a normal operation mode in which the image reader is in an operation enabled state and an energy-saving mode in which the image reader is in an operation stop state,
wherein, upon receipt of a trigger to return from the energy saving mode to the normal operation mode and prior to completion of a mode setting operation for the first reader, the image reader is configured to perform a start-up operation including a first initial operation for returning the first reader to the normal operation mode and then perform a second initial operation for returning the second reader to the normal operation mode independently of an initial operation of the document feeder and after completion of a mode setting operation for the second reader.

10. The image forming apparatus of claim 9, wherein the image reader is configured to finish the second initial operation before a leading edge of the document fed by the document feeder arrives at the second reader.

11. The image forming apparatus of claim 9, wherein the first reader is configured to remain in the operation enabled state on detection of abnormality of the second reader.

12. The image forming apparatus of claim 9, wherein, with the normal operation mode selected, the image reader is configured to perform the second initial operation during the start-up operation including the first initial operation.

13. The image forming apparatus of claim 9, wherein the image reader is configured to perform the second initial operation, to return the second reader to the normal operation mode, after completion of the first initial operation.

14. The image forming apparatus of claim 9, wherein the image reader is configured to perform the second initial operation, to return the second reader to the normal operation mode, after enablement of a dual face mode for reading of both the first and second face of the document.

15. A method for a document reading device including an image reader including a first reader to read a first image from a first face of a document fed by a document feeder and a second reader to read a second face of the document, with an operation mode being switchable between a normal operation mode in which the image reader is in an operation enabled state and an energy-saving mode in which the image reader is in an operation stop state, the method comprising:
performing a start-up operation, upon receipt of a trigger to return from the energy saving mode to the normal operation mode and prior to completion of a mode setting operation for the first reader, including a first initial operation to return the first reader to the normal operation mode and then a second initial operation to return the second reader to the normal operation mode independently of an initial operation of the document feeder and after completion of a mode setting operation for the second reader.

16. The method of claim 15, wherein the second initial operation is finished before a leading edge of the document fed by the document feeder arrives at the second reader.

17. The method of claim 15, wherein the first reader remains in the operation enabled state on detection of abnormality of the second reader.

18. The method of claim 15, wherein, with the normal operation mode selected, the second initial operation is performed during the start-up operation including the first initial operation.

19. The method of claim 15, wherein the second initial operation is performed, to return the second reader to the normal operation mode, after completion of the first initial operation.

20. The method of claim 15, wherein the second initial operation is performed, to return the second reader to the normal operation mode, after enablement of a dual face mode for reading of both the first and second face of the document.

* * * * *